(12) United States Patent
Eriksen et al.

(10) Patent No.: US 8,037,754 B2
(45) Date of Patent: Oct. 18, 2011

(54) INTEGRATED INERTIAL MEASUREMENT SYSTEM AND METHODS OF CONSTRUCTING THE SAME

(75) Inventors: Odd Harald Steen Eriksen, Minneapolis, MN (US); Robert William Stuelke, Minneapolis, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 642 days.

(21) Appl. No.: 12/138,109

(22) Filed: Jun. 12, 2008

(65) Prior Publication Data

US 2009/0308157 A1    Dec. 17, 2009

(51) Int. Cl.
*G01P 1/02* (2006.01)
(52) U.S. Cl. ........................................................ 73/493
(58) Field of Classification Search ................ 73/493, 73/510, 511, 866.5, 431
See application file for complete search history.

(56) References Cited

U.S. PATENT DOCUMENTS

| | | | | |
|---|---|---|---|---|
| 4,125,017 A | * | 11/1978 | Dhuyvetter et al. | 73/178 R |
| 4,179,818 A | * | 12/1979 | Craig | 33/321 |
| 5,038,613 A | * | 8/1991 | Takenaka et al. | 73/510 |
| 5,433,110 A | * | 7/1995 | Gertz et al. | 73/514.35 |
| 6,115,261 A | * | 9/2000 | Platt et al. | 361/760 |
| 6,412,346 B2 | * | 7/2002 | Barkai et al. | 73/493 |
| 7,253,079 B2 | * | 8/2007 | Hanson et al. | 438/417 |
| 7,370,530 B2 | * | 5/2008 | DCamp et al. | 73/493 |
| 7,467,552 B2 | * | 12/2008 | MacGugan | 73/493 |
| 7,814,791 B2 | * | 10/2010 | Andersson et al. | 73/504.03 |
| 2003/0163282 A1 | * | 8/2003 | Krieg et al. | 702/152 |

OTHER PUBLICATIONS

Soehren, Wayne, et al., "A MEMS-based Guidance, Navigation and Control Unit," Honeywell Laboratories, IEEE Position Location and Navigation Symposium, Palm Springs, California, Apr. 15, 2002; pp. 189-195.
Faulkner, N. M., et al., "Integrated MEMS/GPS Navigation Systems," BAE Systems, IEEE Position Location and Navigation Symposium, Palm Springs, California, Apr. 15, 2002; pp. 306-313.
"Mesoscopic Integrated Conformal Electronics (MICE)," Web page (www.darpa.mil/dso/archives/mice/), DARPA (Defense Advanced Research Projects Agency), Defense Sciences Office.

* cited by examiner

*Primary Examiner* — Helen C. Kwok
(74) *Attorney, Agent, or Firm* — Scott D. Wofsy; Edwards Angell Palmer & Dodge LLP (57) ABSTRACT

An inertial measurement system having a triangular cupola shaped base structure with three mutually orthogonal sides and a bottom surface surrounding a hollow core. The bottom surface includes an aperture providing access to the hollow core. An inertial module is mounted on each of the sides and includes a gyroscopic rotational rate sensor and a linear accelerometer connected to a circuit board. The inertial measurement system also includes a motherboard and a plurality of metallization elements. The metallization elements extend from the bottom surface to the sides of the base structure and conductively connect the inertial module to the motherboard. The inertial measurement system may also include a non-conductive adhesive underfill positioned between the inertial module and the base structure.

24 Claims, 8 Drawing Sheets

INTEGRATED INERTIAL MEASUREMENT SYSTEM AND METHODS OF CONSTRUCTING THE SAME

BACKGROUND OF THE INVENTION

1. Field of the Invention

The present invention relates to a three axis inertial measurement unit, and more particularly, to a compact, robust, and reliable three axis inertial measurement unit having a gyroscopic rotational rate sensor and a linear accelerometer.

2. Description of Related Art

Inertial measurement units (IMU) are known in the art and have been used in a wide variety of applications. For example, IMUs are commonly used in inertial guidance and navigation systems for all types of vehicles, in particular aircraft and spacecraft. Inertial navigation has the advantage of not being dependent on an external point of reference. Navigation is accomplished by sensing the motion of the vehicle and calculating the change in position with respect to an initial position.

A typical IMU consists of three equal modules, each including a gyroscopic rotational rate sensor, a linear accelerometer, and associated electronics. Each module is typically oriented on a cube or a similar structure to provide inertial measurements along one of three orthogonal axes, with the gyroscopic rotational rate sensors providing information regarding rotation of the unit and the accelerometers providing information concerning linear movement of the unit. In this way, the IMU is able to determine the position of the vehicle with respect to the vehicle's initial position to aid in guidance, navigation, and control of the vehicle.

Three axis inertial measurement units as described above have been used extensively in aerospace applications. Traditionally, such IMUs included conventional spinning mass gyroscopes and large mechanical accelerometers. However, most current IMUs utilize microelectromechanical systems (MEMS) devices. Current technologies using MEMS devices encapsulate the accelerometer, gyroscope, and associated electronics into individual packages. These packages are typically soldered to a circuit board, which is then mounted on one plane of an orthogonal assembly, such as a face of a cube. Electrical connections are made with wires and the circuit card assembly is attached to the orthogonal structure with conventional fasteners. These connections and fasteners increase the amount of space needed to house the complete IMU assembly and are prone to failure from fatigue.

Accordingly, there is a need in the art for an inertial measurement unit that is robust and compact and that will reduce the likelihood of failure of electrical connections.

SUMMARY OF THE INVENTION

Advantages of the present invention will be set forth in and become apparent from the description that follows. Additional advantages of the invention will be realized and attained by the systems and methods particularly pointed out in the written description and claims, as well as from the appended drawings.

To achieve these and other advantages and in accordance with the purpose of the invention, as embodied herein, the invention includes a method of constructing an integrated inertial measurement unit. The method includes the step of forming a base structure having three mutually orthogonal planar surfaces and a bottom surface. The bottom surface has an aperture providing access to a hollow core, and each of the planar surfaces forms a linear junction with the bottom surface. The method also includes the step of bridging each of the linear junctions with a metallization layer, and the step of surface mounting an inertial module on each of the planar surfaces, allowing the inertial module to interface with at least a portion of the metallization layer. The step of forming a metallization layer may include forming a plurality of discrete metallization elements across the linear junction.

An inertial measurement system is also provided. The inertial measurement system includes a triangular cupola shaped base structure with three mutually orthogonal sides and a bottom surface surrounding a hollow core. The bottom surface includes an aperture providing access to the hollow core. An inertial module is mounted on each of the sides and includes a gyroscopic rotational rate sensor and a linear accelerometer connected to a circuit board. The inertial measurement system also includes a motherboard and a plurality of metallization elements. The metallization elements extend from the bottom surface to the sides of the base structure and conductively connect the inertial module to the motherboard. The inertial measurement system may also include a nonconductive adhesive underfill positioned between at least a portion of the inertial module and the base structure to securely fasten the inertial module to the base structure.

It is to be understood by those having ordinary skill in the art that the foregoing general description and the following detailed description are exemplary and are intended to provide further explanation of the invention claimed. The accompanying drawings, which are incorporated in and constitute part of this specification, are included to illustrate and provide a further understanding of the method and system of the invention. Together with the description, the drawings serve to explain principles of the invention.

BRIEF DESCRIPTION OF THE DRAWINGS

So that those skilled in the art to which the subject invention pertains will readily understand how to make and use the inertial measurement unit disclosed herein without undue experimentation, preferred embodiments thereof will be described in detail below with reference to the following figures.

DETAILED DESCRIPTION OF THE PREFERRED EMBODIMENTS

The subject invention provides a robust and compact inertial measurement unit having a near monolithic construction. The inertial measurement unit reduces or eliminates the need for wires, fasteners, and intermediate packages and thus reduces the likelihood of failure due to wear and fatigue of these components. The inertial measurement unit also reduces the volume required to house the components of the system.

As explained in more detail below, the inertial measurement unit (IMU) includes a base structure with at least three mutually orthogonal sides and a circuit card assembly. The circuit card assembly includes at least one ceramic circuit board mounting one or more microelectromechanical systems (MEMS) devices, for example, a MEMS gyroscope and/or a MEMS accelerometer. Each MEMS device requires associated electronics, which are mounted to the circuit board in "chip on board" fashion. The devices are preferably flip-chip mounted to the circuit board to eliminate wirebonds. All devices are preferably underfilled with an epoxy or other non-conductive material, which provides a high-strength attachment to the circuit board. The circuit card assembly is preferably solder bumped and attached using a flip-chip assembly process to the orthogonal base structure which supports the circuit card assembly and provides electrical connections to the assembly.

In one exemplary embodiment of the subject invention, the base structure is a cube, providing a plurality of orthogonal faces for mounting the MEMS devices and associated electronics. To allow for the surface mounting of the circuit card assemblies, metallic traces and solder pads are applied to the orthogonal faces of the cube in such a way as to receive the circuit card assemblies and connect to corresponding pads on the circuit card assembly. Preferably, the pads are solderable, but may be any metal to which a conductive epoxy may be applied in lieu of solder.

The cube may be made of a ceramic material. Application of metallic traces on planar ceramic structures has traditionally been accomplished using a process such as silk screening, which is well known in the art. However, applying metallic traces to a three-dimensional structure, such as the cube described above, requires an unconventional approach to metallization.

The inventors of the present invention have successfully demonstrated several novel methods of applying a metallization layer to a three dimensional structure, including the direct write method and the emboss and grind method.

Figure 6:
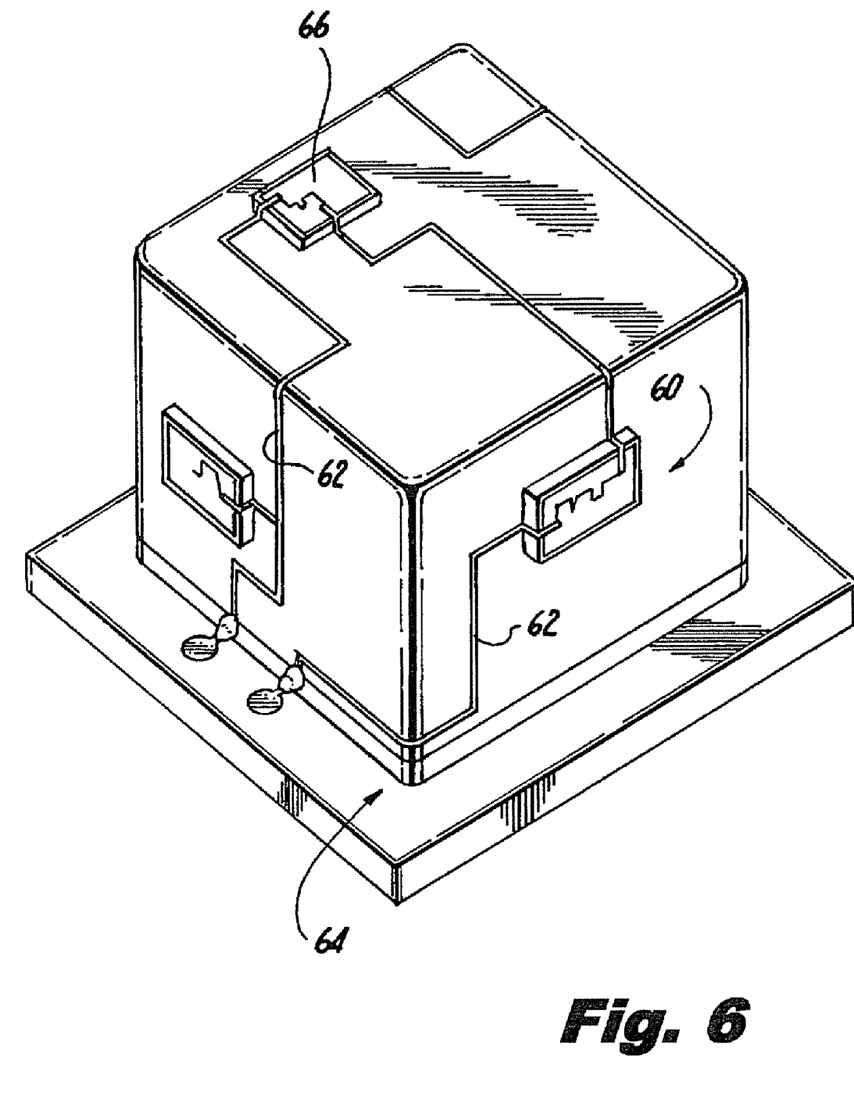
FIG. 6 is a perspective view of a cube having metallization traces applied around corners and from the surface of a circuit board to the edge of the cube by a direct write method.

FIG. 6 shows a silicon die or cube 60 having a metallization layer applied by the direct write method. In the direct write method, a metal precursor such as an ink or other chemical is deposited in fine lines by various writing technologies. These technologies allow five axis articulation of the deposition tool which spray deposits the metal precursor onto the three dimensional structure. In this manner, metallization lines 62 can be written around corners and similarly from the surface of a circuit board 64 over the edges of the silicon die 60 so as to electrically connect the die to electronic components 66 without the use of wirebonds. Metallization lines 62 are also written up and over the edges of components 66 to connect to bond pads on the surface of components 66. Metallization lines 62 may be electrically connected by a serpentine pattern formed on the surface of components 66.

The emboss and grind method can be used to apply a metallization layer of a defined width and spacing to planar ceramic substrates. In this method, the surface of a ceramic substrate is embossed with the pattern desired in the metal traces during pressing. The entire ceramic substrate is metallized using conventional metallization materials. The surface of the substrate is then fired. After firing, the raised surfaces of the ceramic substrate are ground, leaving the embossed details with the metallization remaining therein.

Figure 7:
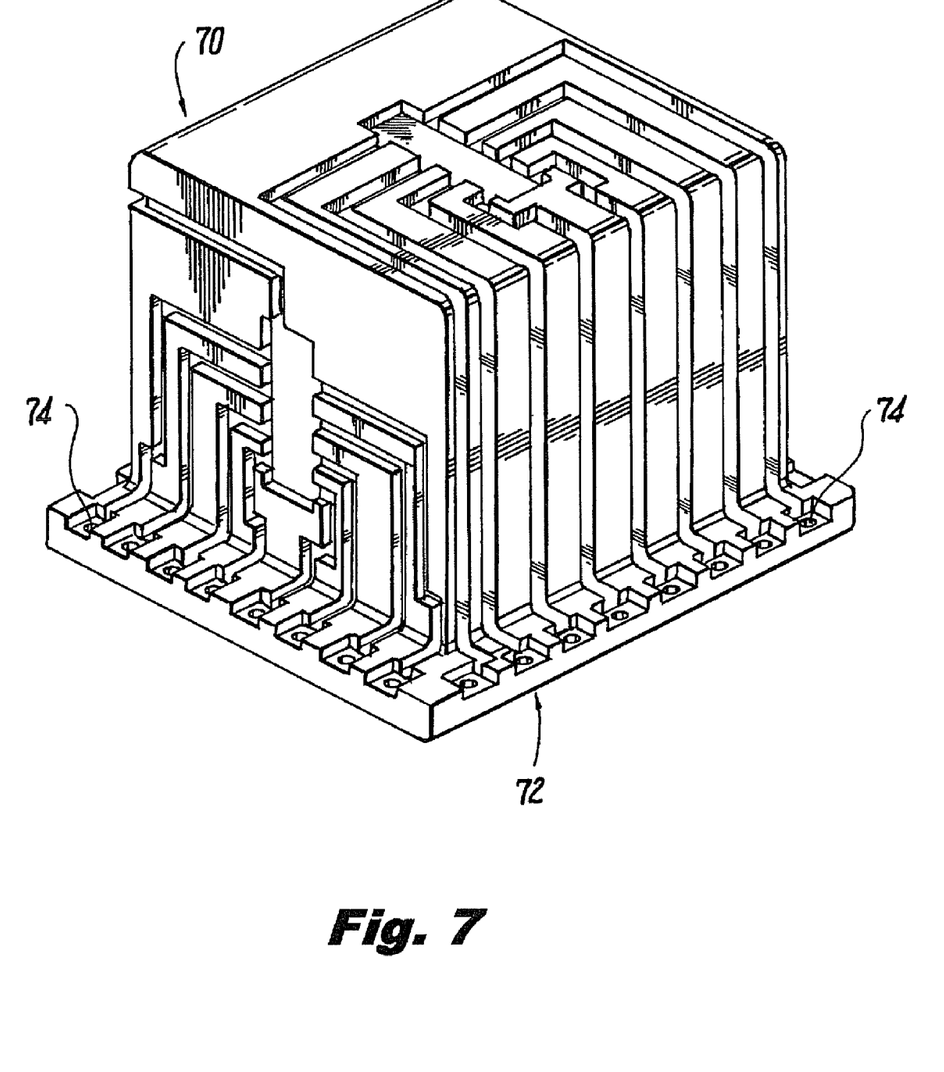
FIG. 7 is a perspective view of a three dimensional ceramic cube with embossed details formed by injection molding.
Figure 8:
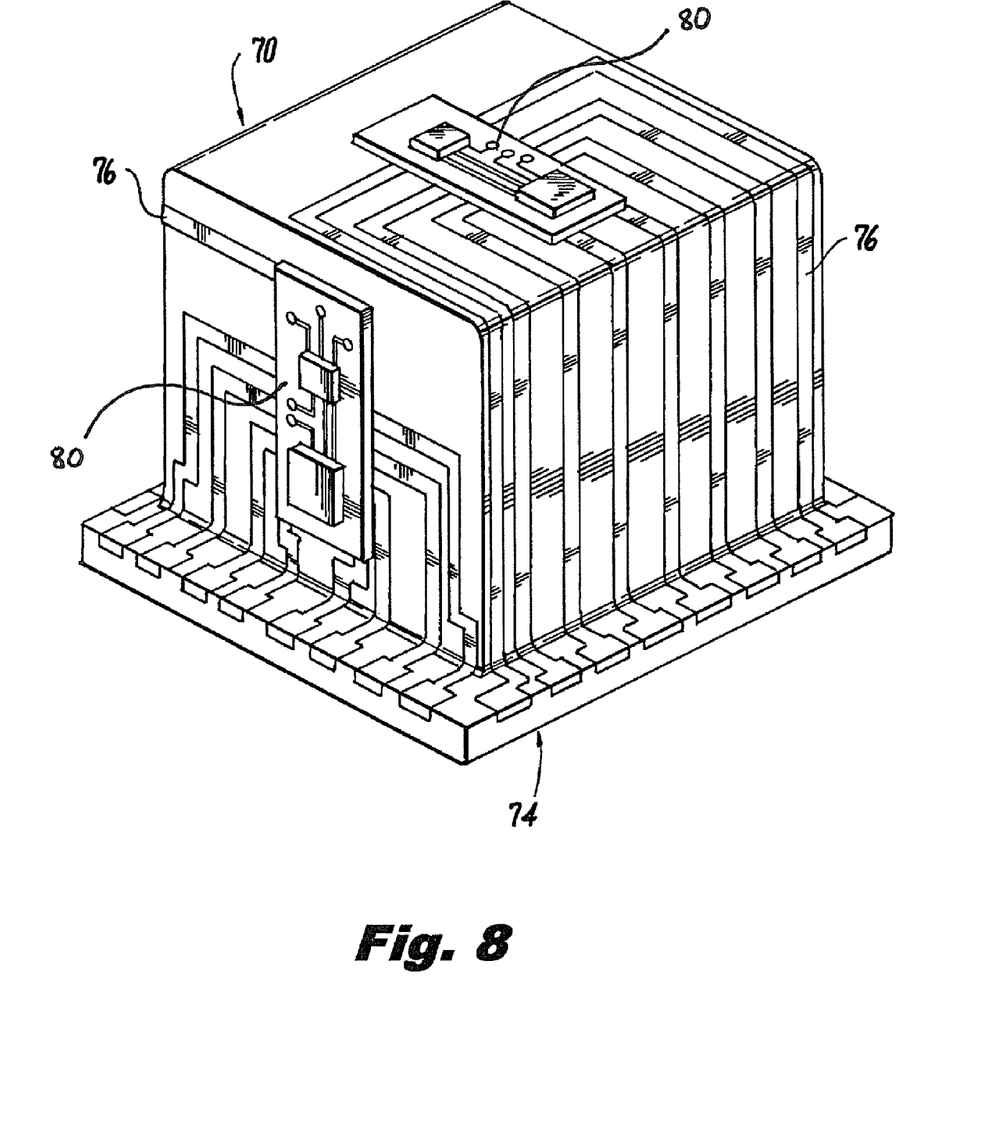
FIG. 8 is a perspective view of the cube of FIG. 7, with a metallization layer applied to the embossed details and electrically connecting the cube to a sensing device.

As shown in FIGS. 7 and 8, this process can be applied to three dimensional structures as well. The fabrication can be performed by green machining of an unfired ceramic substrate, as is known in the art, followed by sintering and metallization. Fabrication can also be accomplished by injection molding a three-dimensional ceramic structure with the embossed details formed in the injection mold pattern, as shown in FIG. 7. In the exemplary embodiment shown, the ceramic structure is a three dimensional cube 70 including a flange 72 having metallized holes or apertures 74 that are configured to interface with a pin-type interfacing element. FIG. 8 shows three dimensional cube 70 after an electronic device 80 has been mounted to cube 70 and interconnected by means of a metallization layer 76 housed within the embossed details of the injection mold pattern.

With this background, reference will now be made in detail to the present preferred embodiments of the inertial measurement unit, examples of which are illustrated in the accompanying drawings. For purposes of explanation and illustration, and not limitation, a perspective view of an exemplary embodiment of the inertial measurement unit is shown in FIG. 1 and is designated generally by reference character 10.

Figure 1:
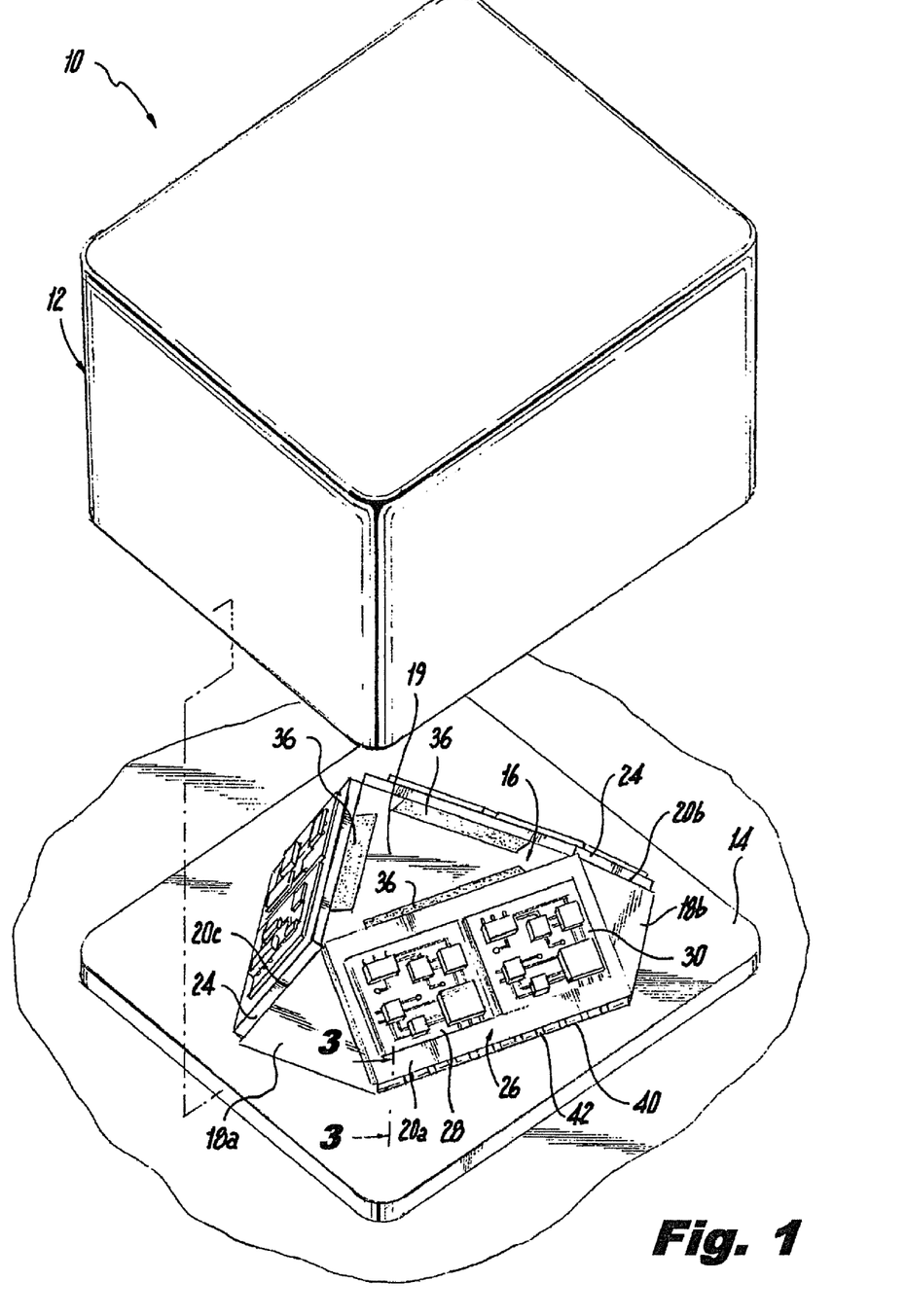
FIG. 1 is a perspective view of an inertial measurement unit constructed in accordance with an exemplary embodiment of the present invention, with the housing separated from the support circuit board to reveal the triangular cupola shaped base structure.

Referring to FIG. 1, inertial measurement unit 10 includes a box-like housing 12 removably connected to a rectangular motherboard or support circuit board 14. A base structure 16 is mounted on support circuit board 14. Base structure 16 may be constructed from any insulating material on which electrical traces and contact pads can be deposited, such as a plastic material or a ceramic material. Ceramic material is preferred for its ability to withstand high inertial loads as well as high shock loads.

While a cube is an effective and sufficient shape for the base structure, in the preferred embodiment shown in FIG. 1, base structure 16 is the shape of a triangular cupola. A triangular cupola is defined as a polyhedron having nine vertices, eight surfaces, and fifteen edges. The triangular cupola shape of base structure 16 has four triangular surfaces, including three triangular sidewalls 18a, 18b, 18c and a triangular top surface 19; three rectangular surfaces 20a, 20b, 20c; and one hexagonal bottom surface 22 (shown in FIG. 4).

A triangular cupola shape is formed by truncating each of the four vertices of a regular tetrahedron, which can be thought of as the vertex of a cube, and thus has three mutually orthogonal surfaces. In the embodiment shown in FIG. 1, rectangular surfaces 20 are orthogonal to each other. That is, each surface 20 is oriented at a 90° angle with respect to each of the other surfaces 20. For example, surface 20a is oriented at approximately a 90° angle with respect to both surface 20b and to surface 20c. Consequently, the triangular cupola shape of base structure 16 provides the same functionality as a cube-shaped structure in a smaller volume.

Figure 4:
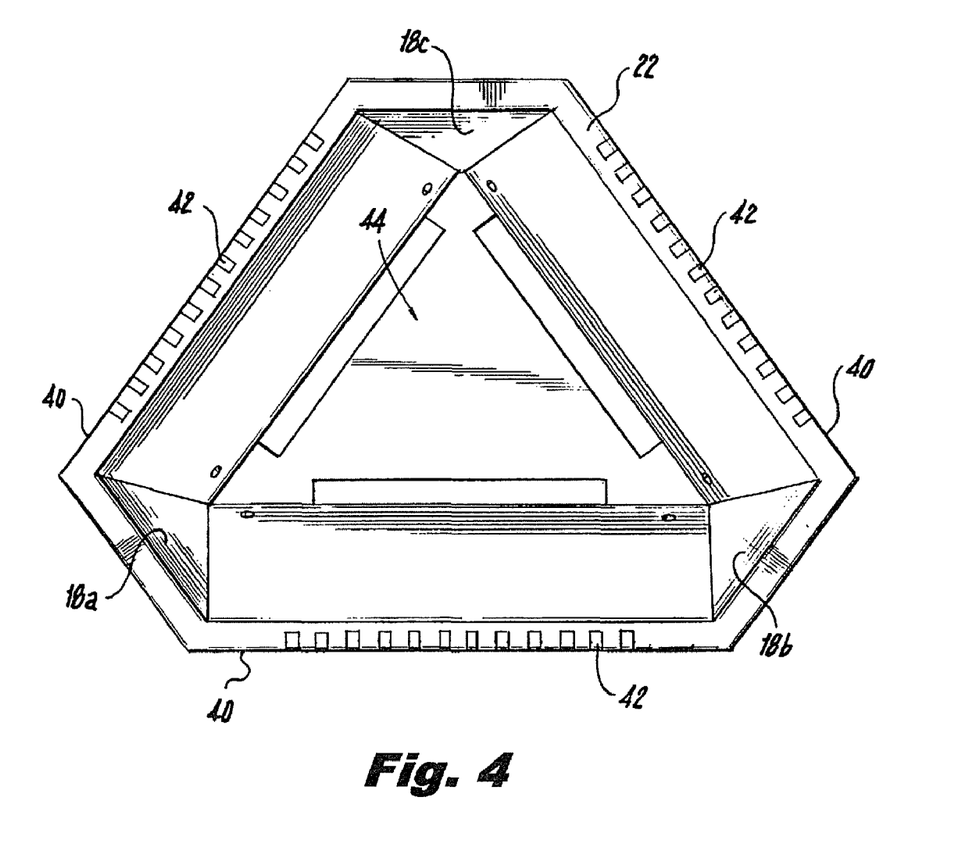
FIG. 4 is a bottom view of the base structure of the inertial measurement unit shown in FIG. 1, showing the hollow core of the base structure through the aperture formed in the base structure.

Hexagonal surface 22 of base structure 16 defines the bottom surface of the base structure (as shown in FIG. 4) and is adapted and configured to be mounted to support circuit board 14. When mounted, hexagonal surface 22 is substantially parallel to support circuit board 14 and orthogonal surfaces 20a-20c are oriented at approximately a 54.7° angle with respect to an upper surface of support circuit board 14. This configuration extends the dynamic range of the gyroscope roll axis from 200°/sec to 350°/sec and allows for better compensation of symmetrical distortion when compared to a conventional configuration using a cube structure.

The conventional cube configuration uses three sensors, each placed on different faces of the cube. One of the sensors is on the roll axis, where it reads the full rotational rate, while the other two are exposed to high centripetal acceleration. By tilting the structure at a 54.7° angle, the sensor senses only a portion (by the cosine of 54.7°) of the roll rate, which allows sensing of a greater level of rotational acceleration without saturating the sensor. Further, all three sensors are symmetrical in sensing of the rotation about the roll axis and are exposed to the same centripetal acceleration, thus reducing acceleration induced errors.

In the embodiment shown in FIG. 1, a circuit card assembly 24 is mounted to each orthogonal surface 20. Each circuit card assembly 24 includes an inertial module 26 mounted to the assembly. Each inertial module 26 includes one or more microelectromechanical systems (MEMS) devices. In the embodiment shown in FIGS. 1 and 2, each inertial module 26 includes a MEMS gyroscopic rotational rate sensor 28 and a MEMS accelerometer 30. The embodiment shown thus includes three equal inertial modules, each module including a gyroscopic rotational rate sensor 28, a linear accelerometer 30, and the electronics associated with each of these devices. Each module is oriented to provide inertial measurements along a distinct axis, with each axis being orthogonal to the other two axes. Inertial measurement unit 10 is thus configured to provide inertial measurements along three orthogonal axes.

Figure 1A:
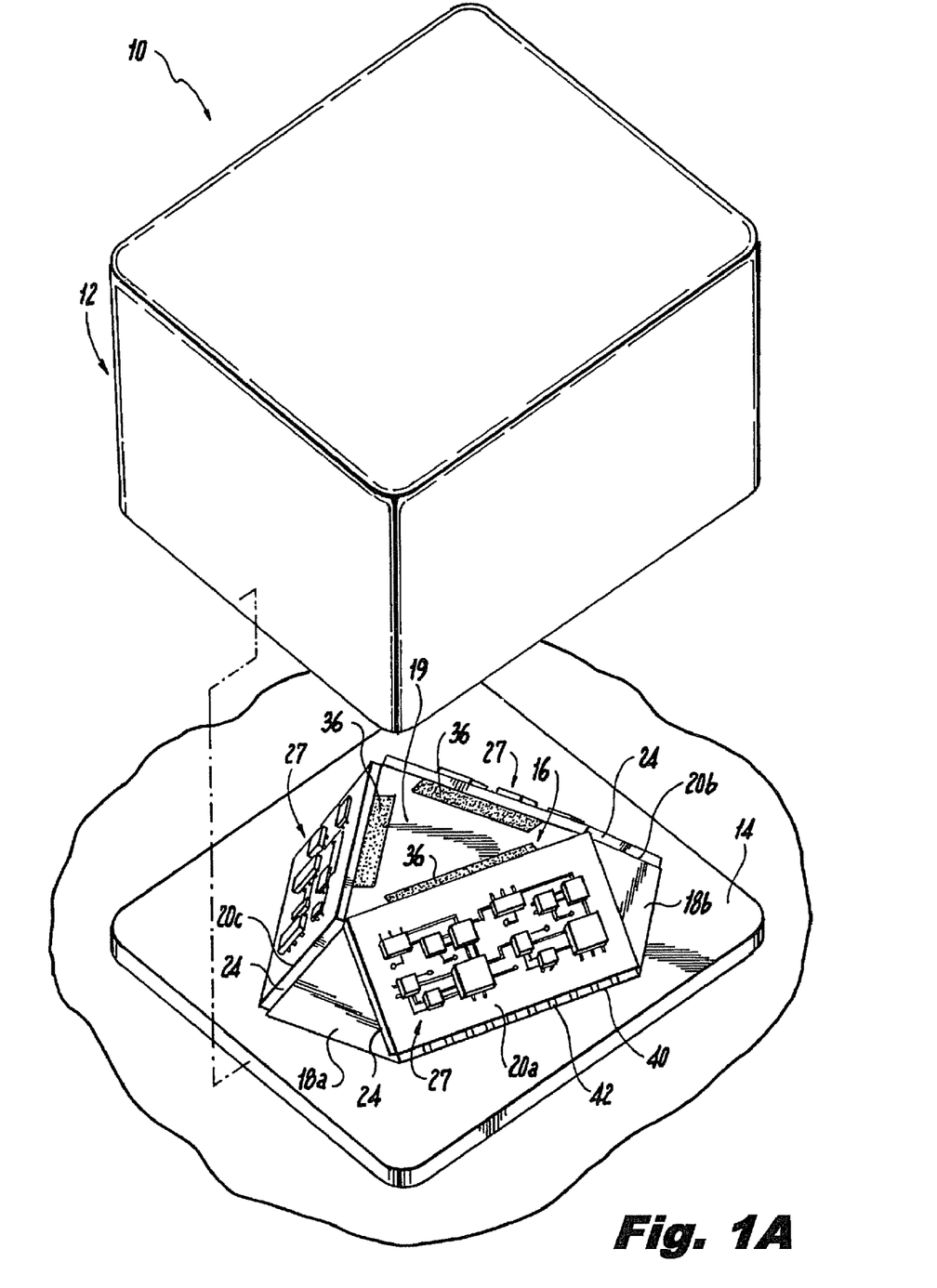
FIG. 1A is a perspective view of another exemplary embodiment of the inertial measurement unit of the present invention, with a plurality of MEMS components mounted directly to a circuit card assembly.

Another exemplary embodiment of an inertial measurement unit is shown in FIG. 1A. In this embodiment, MEMS components 27 and/or other devices are mounted directly to circuit card assembly 24, to create a single assembly. The remaining elements of this embodiment are similar to the embodiment shown in FIG. 1 and are numbered accordingly. Mounting MEMS components 27 directly to circuit card assembly 24 reduces the overall weight of inertial measurement unit 10 and also reduces the number of connections needed, thus reducing the number of points where failure and fatigue may occur. MEMS components 27 may include a gyroscopic rotational rate sensor and an accelerometer, among others.

Inertial measurement unit 10 can be used in guidance, navigation, and control systems for a wide variety of aerospace vehicles, including aircraft, spacecraft, and weapon systems. For example, inertial measurement unit 10 may be mounted inside an airplane. Given an initial position of the airplane, inertial measurement system 10 will be able to continually track the position and velocity of the airplane without relying upon input from an external system. The MEMS gyroscope 28 and MEMS accelerometer 30 of inertial module 26 are configured to continually send signals to a flight control computer of the airplane, which in turn sends appropriate signals to actuators interfacing with the control surfaces of the airplane to change the pitch, yaw, and roll of the aircraft as needed.

Use of inertial reference unit 10 is not limited to aerospace applications, however. Inertial reference unit 10 may also be used in automotive systems, robotics, industrial equipment, video game controllers, mobile phones, and toys, among other applications.

Circuit card assembly 24 may be made of a fiber-reinforced epoxy or a polyimide. Metallization elements may be made from electroplated metals suitable for soldering. Circuit card assembly 24 may also be made of a ceramic material. Choice of materials for circuit card assembly 24 may be governed by the desire to match physical properties between base structure 16 and circuit card assembly 24. Preferably, circuit card assembly 24 and base structure 16 are made from similar ceramic materials, allowing for similar rates of thermal expansion, and a reduction in failure rates caused by uneven thermal expansion between the base structure and the circuit card assembly. Ceramic circuit card assembly 24 includes contact pads with solder bumps on the side interfacing with base structure 16 and contacts on the top side of the circuit card assembly for probing and programming the electronic devices on inertial measurement unit 10. The underside of circuit card assembly 24 can be underfilled with an epoxy or other non-conductive material to bond circuit card assembly 24 to base structure 16 and to provide support under high inertial and shock loads. In one exemplary embodiment, the non-conductive material is an adhesive. In one exemplary embodiment, the non-conductive material is applied to the peripheral edges of circuit card assembly 24. In another exemplary embodiment, the non-conductive material is applied to substantially all of the surface of the circuit card assembly that interfaces with the base structure.

In one exemplary embodiment of the subject invention, circuit card assembly 24 is a thick film layup on a single layer ceramic substrate. The method of producing a circuit card having a thick film layup involves using a series of silk screens and stencils to apply overlapping layers of metal and dielectric. The ceramic substrate is first drilled for vias, which are passageways allowing for interconnection of the layers of the circuit card. Next, thick film inks and dielectrics are layered upon each other to generate the circuit interconnections. This process is relatively inexpensive, however, lower dielectric thickness and the potential for pinholes can cause isolation issues, and the quality of the final circuit card may be highly dependent on the skill of the manufacturer.

The MEMS devices may be adhesively bonded to circuit card assembly 24, depending on the design of the assembly. Electrical connection between the MEMS devices and the substrate would be with wirebonds. Wirebonds are enveloped or potted in adhesive for stability under shock and vibration. Circuit card assembly 24 may be a double-sided board assembly, that is, both the top and the bottom of the circuit card assembly 24 are used to mount electronic components. The electronic components may be Application Specific Integrated Circuit (ASIC) devices and/or passive components. The ASICs are mounted in flip chip fashion as ball grid arrays, using solder bumps, or using printed solder paste applied to the contacts on the circuit card assembly 24. The passive components may be mounted as pelletized chip devices, leadless inverted devices, or end terminated devices.

Circuit card assembly 24 may also be formed as a multilayer, co-fired ceramic. Multilayered co-fired ceramic circuit boards allow for three dimensional geometry, more complex circuitry, deeper and more complex via interconnects, and better dielectric isolation between layers. The three dimensional geometries allowed in co-fired ceramics also offer an advantage in the mounting of MEMS devices. Many MEMS devices have structures where the electrical contacts are on a step, that is, not on the same plane as the top of the MEMS device, which makes wirebond connections necessary. Co-fired ceramics can be made with recesses or cavities, thus allowing the MEMS devices to be flip-chip bonded similar to integrated circuits and ball grid arrays. The taller piece of the MEMS device sits in the cavity allowing the contact to mate with pads on the circuit board.

Figure 2:
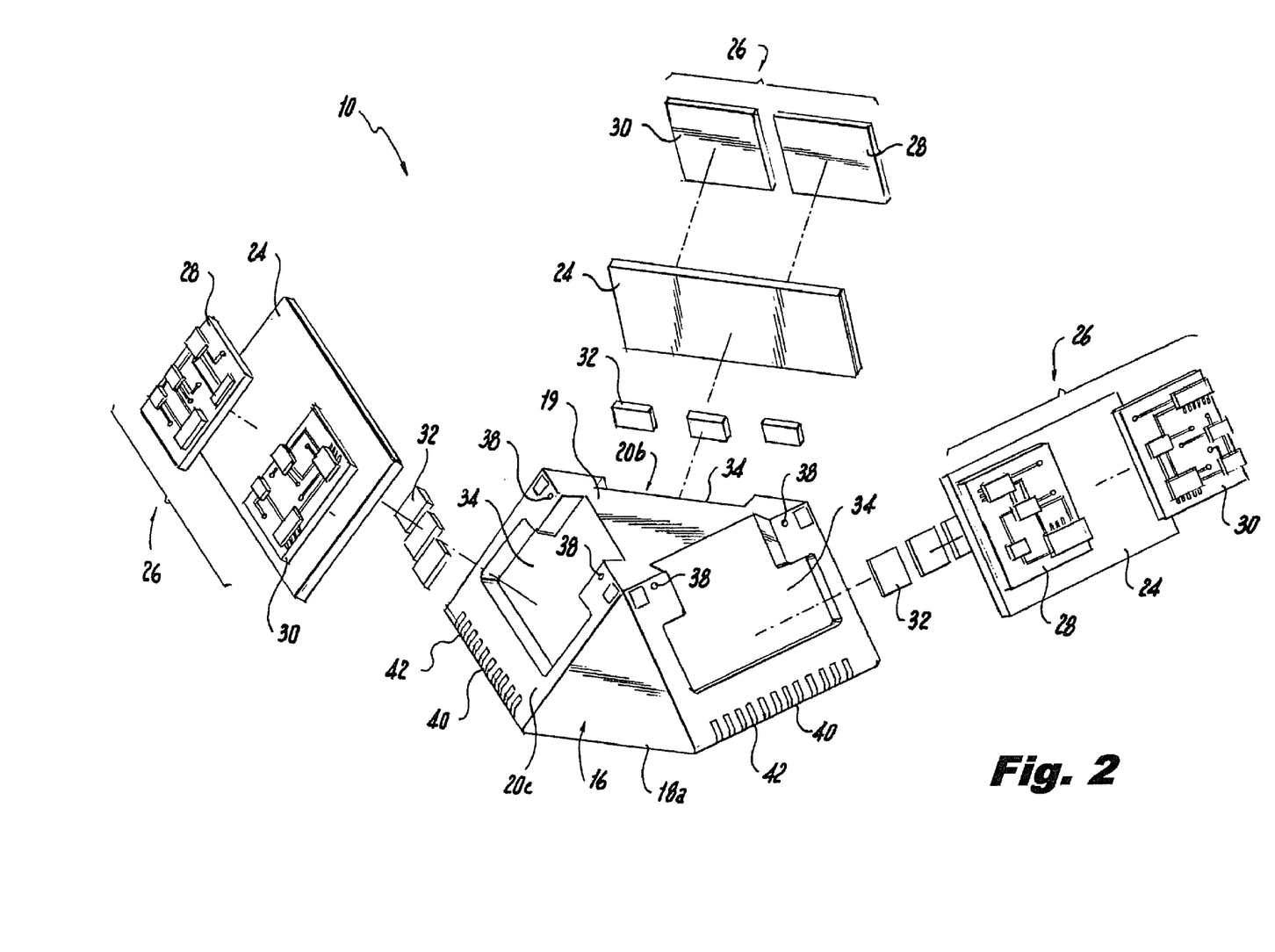
FIG. 2 is an exploded perspective view of the inertial measurement unit shown in FIG. 1, with parts separated for ease of illustration.

As shown in FIG. 2, MEMS devices such as gyroscopic rotational rate sensor 28 and accelerometer 30 of inertial module 26 are flip-chip mounted to a first side of circuit card assembly 24, and application specific integrated circuits (ASIC) 32 are flip-chip mounted to a second side of circuit card assembly 24. Base structure 16 may be formed by a conventional pressing and sintering process. Preferably, base structure 16 is formed by injection molding, which allows a recessed portion 34 to be molded into each of the orthogonal surfaces 20 to accommodate the components mounted on the second side of circuit card assembly 24. Injection molding allows for the production of base structure 16 in near net shape, including fine details and features, without the need for secondary operations.

After circuit card assembly 24 has been mounted, recessed portion 34 (shown in FIG. 2) may be filled with a non-conductive material 36 (shown in FIG. 1), such as a reinforced epoxy or polyimide. An epoxy underfill may be applied to the periphery of circuit card assembly 24 and serves to securely fasten circuit card assembly 24 to base structure 16. Filling recessed portion 34 with non-conductive material 36 also ensures that circuit card assembly 24 can withstand high inertial loads by securing the entire circuit card assembly adhesively rather than by simply bonding the edges. Filling recessed portion 34 with non-conductive material 36 also minimizes any deflections of the circuit card assembly under such loads. By analysis, the inventors have determined that this configuration allows inertial measurement unit 10 to withstand inertial loads as high as 50,000 g (force of gravity at sea level) without being damaged or losing functionality.

Alignment of the MEMS devices relative to one another and relative to the axis of measurement is critical. Such alignment depends on the mounting of the gyroscope 28 and accelerometer 30 on circuit card assembly 24, and on the mounting of circuit card assembly 24 on base structure 16. In one exemplary embodiment, alignment of circuit card assembly 24 with base structure 16 is effected using removable pins 38 extending from holes in base structure 16 that are adapted and configured to engage slots in circuit card assembly 24.

Figure 3:
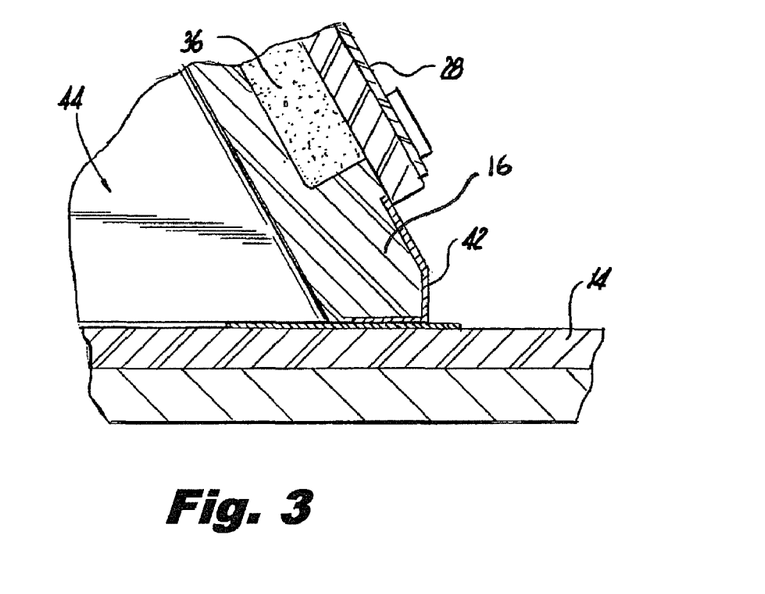
FIG. 3 is a partial section view of the inertial measurement unit of the present invention, taken along line 3-3 of FIG. 1, illustrating the metallic traces that wrap around the edges of the base structure.

As indicated above, base structure 16 has a triangular cupola shape that includes, among other surfaces, three rectangular surfaces 20, and a hexagonal bottom surface 22. Each rectangular surface 20 is oriented at approximately 54.7° with respect to bottom surface 22. Each of the planar surfaces 20 forms a linear junction 40 with bottom surface 22. A metallization layer 42 is disposed on both bottom surface 22 and rectangular surfaces 20 and bridges each of the linear junctions 40. In other words, as best seen in FIG. 3, metallization layer 42 wraps around the corners of the triangular cupola shaped base structure 16. Support circuit card 14 and circuit card assembly 24 are conductively connected to metallization layer 42, which allows support circuit card 14 and circuit card assembly 24, including its associated MEMS devices and other electronics, to interface with one another.

In the embodiment shown in FIGS. 2 and 3, metallization layer 42 includes a plurality of discrete metallic traces 42 that wrap around the edges of base structure 16 to engage and connect both the circuit card assembly 24 and the support circuit board 14. That is, metallic traces 42 extend across linear junctions 40 to connect rectangular surfaces 20 with hexagonal bottom surface 22. The planar surfaces of base structure 16 allow for the use of well-known screen printing methods for metallization. These methods can be adapted to wrap the traces around the edges of base structure 16.

The triangular cupola shape of base structure 16 allows for construction of an inertial measurement unit with a significantly reduced size when compared to similar systems. Form factor reduction, that is reduction in the size and shape of the support circuit board 14, is also gained by constructing circuit card assemblies 24 using chip on board techniques that reduce or eliminate wirebond connections. The shape of base structure 16 and the configuration of the components mounted on the base structure reduce the planar area required on support circuit board 14 to mount the entire inertial measurement unit 10.

Figure 5:
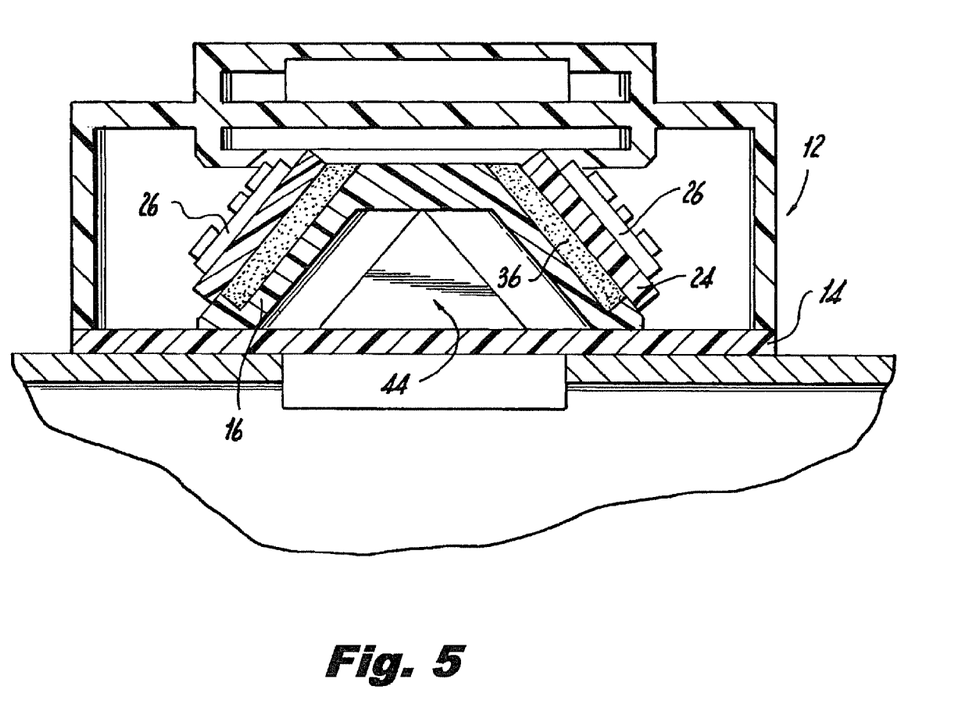
FIG. 5 is a cross-sectional view of the inertial measurement unit constructed in accordance with an exemplary embodiment of the present invention.

Additionally, as shown in FIGS. 4 and 5, base structure 16 includes a hollow core 44. Hollow core 44 reduces the overall mass of inertial measurement unit 10 and provides an internal volume that allows for mounting of additional devices on support circuit board 14. For example, hollow core 44 could be used to mount additional sensing devices or other support electronics.

Other components associated with the inertial measurement unit 10 may be mounted above housing 12 to interface with inertial measurement unit 10. For example, an additional housing structure may be mounted on top of housing 12 to provide space for additional components such as a central processing unit and supporting circuitry. The central processing unit may be mounted to an additional circuit board which in turn interfaces with the MEMS devices and other electrical components mounted to base structure 16.

The inertial measurement unit of the present invention, as described above and shown in the drawings, is a device having superior properties including near monolithic construction, full integration, robustness, compactness, and high strength. By analysis, the inventors have determined that the inertial measurement unit of the present invention is able to withstand high inertial loads as well as high shock loads, and is therefore less susceptible to failure and fatigue. It also requires less space than prior art designs. It will be apparent to those skilled in the art that various modifications and variations can be made to the device of the present invention and to the methods of making the device without departing from the scope of the invention as described in the appended claims and their equivalents.

What is claimed is:

1. A method of constructing an integrated inertial measurement unit, the method comprising the steps of:
    a) forming a base structure having three mutually orthogonal exterior planar surfaces and a bottom surface, the bottom surface having a central aperture, each of the planar surfaces forming a junction with the bottom surface;
    b) bridging each of the junctions with a metallization layer comprising a plurality of discrete metallic traces that wrap around the edges of the base structure such that each one of the traces extends from one of the three orthogonal exterior planar surfaces, across the corresponding junction, and onto the bottom surface;
    c) surface mounting a circuit card assembly on each of the planar surfaces; and
    d) mounting the bottom surface of the base structure to a support circuit board such that the plurality of discrete metallic traces engages with both the circuit card assembly and the support circuit board, and conductively connects the circuit card assembly to the support circuit board without the use of lead wires.

2. The method according to claim 1, wherein the step of surface mounting the circuit card assembly includes flip-chip bonding the circuit card assembly to the base structure.

3. The method of claim 2, wherein the step of surface mounting the circuit card assembly includes underfilling the circuit card assembly with a non-conductive material to securely attach the inertial module to the base structure.

4. The method of claim 3, wherein the step of underfilling the circuit card assembly with a non-conductive material includes underfilling the circuit card assembly with a non-conductive adhesive.

5. The method of claim 1, wherein the step of surface mounting a circuit card assembly on each of the planar surfaces includes connecting a plurality of microelectromechanical devices to a circuit board to form the circuit card assembly.

6. The method of claim 5, wherein the step of connecting a plurality of microelectromechanical devices includes connecting a plurality of non-planar microelectromechanical devices.

7. The method of claim 5, wherein the step of connecting a plurality of microelectromechanical devices to a circuit board includes connecting a linear accelerometer and a gyroscopic rotational rate sensor to the circuit board.

8. The method of claim 5, wherein the step of connecting a plurality of microelectromechanical devices to a circuit board includes connecting the microelectromechanical devices to a circuit board made of a ceramic material.

9. The method of claim 8, wherein the step of connecting a plurality of microelectromechanical devices to a circuit board includes connecting the microelectromechanical devices to a circuit board made of a multi-layer co-fired ceramic material.

10. The method of claim 5, further comprising flip-chip bonding the microelectromechanical devices to the circuit board.

11. The method of claim 1, wherein the base structure is formed from a ceramic substrate.

12. The method of claim 1, wherein the base structure is a triangular cupola shape.

13. The method of claim 1, wherein the step of forming the base structure includes pressing ceramic powder to form the base structure, firing the base structure, and machining the base structure.

14. The method of claim 1, wherein the step of forming the base structure includes injection molding the base structure.

15. An inertial measurement system comprising:
   a) a base structure with three mutually orthogonal sides and a bottom surface surrounding a hollow core, the bottom surface having an aperture providing access to the hollow core and forming a junction with each of the three mutually orthogonal sides;
   b) a circuit card assembly mounted on an exterior surface of each side, the circuit card assembly including a gyroscopic rotational rate sensor and a linear accelerometer connected to a circuit board;
   c) a plurality of metallization elements bridging each of the junctions, the metallization elements comprising a plurality of discrete metallic traces that wrap around the edges of the base structure such that each one of the traces extends from one of the three mutually orthogonal sides, across the corresponding junction, and onto the bottom surface;
   d) wherein the bottom surface of the base structure is mounted to a support circuit board such that the plurality of discrete metallic traces engages with both the circuit card assembly and the support circuit board, and conductively connects the circuit card assembly to the support circuit board without the use of lead wires.

16. The inertial measurement system of claim 15, further comprising a recessed portion formed in each of the three mutually orthogonal sides for accommodating electrical components.

17. The inertial measurement system of claim 16, further comprising a non-conductive adhesive positioned within the recessed portion to securely fasten the circuit card assembly to the base structure.

18. The inertial measurement system of claim 15, further comprising a non-conductive adhesive underfill positioned between at least a portion of the circuit card assembly and the base structure to securely fasten the inertial module to the base structure.

19. The inertial measurement system of claim 15, further comprising a sensing structure mounted within the hollow core of the base structure and connected to the support circuit board.

20. The inertial measurement system of claim 15, wherein the base structure is a triangular cupola shape.

21. The inertial measurement system of claim 15, wherein the base structure is made of a ceramic material.

22. The inertial measurement system of claim 15, wherein the circuit card assembly is surface mounted to the planar surface on the base structure.

23. The inertial measurement system of claim 15, wherein the circuit card assembly is flip-chip bonded to the base structure.

24. An inertial measurement system comprising:
   a) a base structure with three mutually orthogonal sides and a bottom surface surrounding a hollow core, the bottom surface having an aperture providing access to the hollow core, the bottom surface of the base structure being mounted on a support circuit board;
   b) a circuit card assembly mounted on an exterior surface of each side, the circuit card assembly including a plurality of microelectromechanical components mounted directly to the circuit card assembly;
   c) a plurality of metallization elements extending from the bottom surface to the sides of the base structure for conductively connecting the circuit card assembly to a motherboard;
   d) wherein each of the metallization elements comprises a discrete metallic trace that wraps around the edges of the base structure such that each one of the traces extends from one of the three mutually orthogonal sides and onto the bottom surface such that the plurality of discrete metallic traces engages with both the circuit card assembly and the support circuit board, and conductively connects the circuit card assembly to the support circuit board without the use of lead wires.

* * * * *